United States Patent
Godin et al.

(10) Patent No.: US 10,212,750 B2
(45) Date of Patent: Feb. 19, 2019

(54) METHOD AND DEVICE FOR ESTABLISHING A DUAL CONNECTIVITY BETWEEN A USER EQUIPMENT AND A MENB AND A SENB, BY PROVIDING THE USER EQUIPMENT HISTORY INFORMATION

(71) Applicant: Alcatel Lucent, Boulogne-Billancourt (FR)

(72) Inventors: Philippe Godin, Nozay (FR); Hakon Helmers, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 15/112,259

(22) PCT Filed: Jan. 27, 2015

(86) PCT No.: PCT/EP2015/051602
§ 371 (c)(1),
(2) Date: Jul. 18, 2016

(87) PCT Pub. No.: WO2015/113970
PCT Pub. Date: Aug. 6, 2015

(65) Prior Publication Data
US 2016/0338131 A1 Nov. 17, 2016

(30) Foreign Application Priority Data
Jan. 29, 2014 (EP) .................................. 14153126

(51) Int. Cl.
*H04W 4/00* (2018.01)
*H04W 76/15* (2018.01)
(Continued)

(52) U.S. Cl.
CPC ........... *H04W 76/15* (2018.02); *H04L 5/0037* (2013.01); *H04L 5/0098* (2013.01); *H04W 28/08* (2013.01);
(Continued)

(58) Field of Classification Search
CPC combination set(s) only.
See application file for complete search history.

(56) References Cited

U.S. PATENT DOCUMENTS 9,100,883 B2 * 8/2015 Bontu ............... H04W 36/0083
9,585,134 B2 * 2/2017 Yamada ............. H04W 72/042
(Continued)

FOREIGN PATENT DOCUMENTS

EP 2448325 A1 5/2012
EP 2675213 A1 12/2013
(Continued)

OTHER PUBLICATIONS

3GPP TR 36.842 V12.0.0, 3rd Generation Partnership Project; Technical Specification Group Radio Access Network; Study on Small Cell enhancements for E-UTRA and E-UTRAN; Higher layer aspects (Release 12), 71 pages, Dec. 2013.*
(Continued)

*Primary Examiner* — Frank Duong
(74) *Attorney, Agent, or Firm* — Harness, Dickey & Pierce, P.L.C.

(57) ABSTRACT

A method is intended for establishing a dual connectivity between a user equipment and a MeNB and a SeNB. This method includes i) a first step during which the MeNB chooses a SeNB to offload a data rate requested by the user equipment, ii) a second step during which the MeNB sends a resource request, including data defining at least complementary radio resources to be allocated, E-RAB parameters, TNL address information, user equipment capabilities, cur-
(Continued)

rent radio resource configuration for the user equipment, and a user equipment history cell information, to the chosen SeNB, and iii) a third step during which the chosen SeNB determines from these received data and from its not yet allocated radio resources if it can allocate the requested complementary radio resources for the user equipment and how to set corresponding radio parameters.

5 Claims, 1 Drawing Sheet

(51) Int. Cl.
*H04L 5/00* (2006.01)
*H04W 36/32* (2009.01)
*H04W 36/00* (2009.01)
*H04W 28/08* (2009.01)
*H04W 88/06* (2009.01)

(52) U.S. Cl.
CPC ... *H04W 36/0055* (2013.01); *H04W 36/0083* (2013.01); *H04W 36/32* (2013.01); *H04W 88/06* (2013.01)

(56) References Cited

U.S. PATENT DOCUMENTS

| 9,699,825 | B2* | 7/2017 | Lee | H04W 56/00 |
|---|---|---|---|---|
| 2010/0130219 | A1 | 5/2010 | Cave et al. | |
| 2012/0106510 | A1 | 5/2012 | Kuo | |
| 2012/0142355 | A1 | 6/2012 | Jha | |
| 2013/0201960 | A1 | 8/2013 | Kim et al. | |
| 2013/0322389 | A1 | 12/2013 | Maeda et al. | |
| 2014/0010086 | A1 | 1/2014 | Etemad et al. | |
| 2015/0043505 | A1 | 2/2015 | Kim et al. | |
| 2015/0063305 | A1 | 3/2015 | Kim et al. | |
| 2015/0131535 | A1* | 5/2015 | Wallentin | H04W 76/025 370/329 |

FOREIGN PATENT DOCUMENTS

| GB | 2472791 A | 2/2011 |
|---|---|---|
| JP | 2013502748 A | 1/2013 |
| WO | WO-2012134567 A1 | 10/2012 |

OTHER PUBLICATIONS

Presentation of Specification to TSG, 3GPP TSG-RAN#62 RP-131710, Dec. 6, 2013.

Samsung, On mobility information during RRC connection setup, 3GPP TSG-RAN WG2#83bis R2-133423, Oct. 11, 2013.

NEC Group: "Small cell operation under macro coverage", 3GPP Draft; R1-130373 Small_Cell_Under_Macro, 3rd Generation Partnership Project (3GPP), Mobile Competence Centre; 650, Route Des Lucioles; F-06921 Sophia-Antipolis Cedex; France, vol. RAN WG1, No. St. Julian; Jan. 28, 2013-Feb. 1, 2013 Jan. 18, 2013.

International Search Report PCT/ISA/210 for International Application No. PCT/EP2015/051602 dated Aug. 12, 2015.

Written Opinion of the International Searching Authority PCT/ISA/237 for International Application No. PCT/EP2015-051602 dated Aug. 12, 2015.

* cited by examiner

METHOD AND DEVICE FOR ESTABLISHING A DUAL CONNECTIVITY BETWEEN A USER EQUIPMENT AND A MENB AND A SENB, BY PROVIDING THE USER EQUIPMENT HISTORY INFORMATION

CROSS-REFERENCE TO RELATED APPLICATIONS

This is a National Phase of PCT Patent Application No. PCT/EP2015/051602 filed on Jan. 27, 2015, and claims priority to, European Application No. 14153126.9, filed Jan. 29, 2014, the contents of each of which are hereby incorporated by reference in their entirety.

FIELD OF THE INVENTION

The present invention relates to dual connectivity in small cells of mobile (or wireless) communication networks that belongs at least to the 3GPP fourth generation (or 4G).

BACKGROUND

As known by those skilled in the art, to increase the data rate of a user wireless communication equipment the 3GPP has proposed to establish two communication paths between this user wireless communication equipment and respectively a master evolved Node B (or MeNB) and a secondary evolved Node B (or SeNB). This is the so-called dual connectivity.

In the following description it will be considered that the expressions "user wireless communication equipment" and "user equipment" are equivalent.

A MeNB is an eNB that has been chosen initially for serving a user equipment, while a SeNB is an eNB of a small cell that is chosen afterwards to assist a MeNB by offloading one or several bearers of the MeNB into the SeNB.

When the dual connectivity feature is used, one or more data bearers can be "offloaded" from the MeNB to the SeNB according to a method comprising the following steps.

In a step S1 the MeNB, serving a user equipment and wanting to offload a requested data rate, decides to activate complementary radio resources of at least one SeNB. This is a so-called RRM (or Radio Resource Management) decision.

In a step S2 the MeNB sends an addition (or resource) request to a chosen SeNB in order to request this SeNB to allocate complementary radio resources for the bearer(s) to be offloaded. This addition (or resource) request comprises notably E-RAB (or E-UTRAN Radio Access Bearer) parameters, TNL (or Transport Network Layer) address information corresponding to the user plane option, user equipment capabilities and current radio resource configuration for the user equipment.

In a step S3 the RRM entity of the SeNB determines if it can allocate the requested complementary radio resources for the user equipment. This is another RRM decision. If the RRM entity of the SeNB is able to admit the addition (or resource) request, it allocates complementary radio resources (L1 and L2) and appropriate radio parameter settings and may provide a dedicated RACH (or Radio Access CHannel) preamble for the user equipment for synchronization.

In a step S4 the SeNB sends an addition (or resource) response to the MeNB.

In a step S5 the MeNB may verify the proposed new radio resource configuration. This is another RRM decision.

In a step S6, if the MeNB endorses the proposed radio resource configuration, it sends a RRC (or Radio Resource Control) connection reconfiguration message, comprising information defining this proposed radio resource configuration, to the user equipment.

Then in a step S7 the MeNB may send a SN (or Sequence Number) status transfer message, comprising PDCP ("Packet Data Convergence Protocol") sequence numbers, to the SeNB.

In a step S8 the MeNB may also trigger data forwarding towards the SeNB.

In a step S9, when the user equipment has proceeded to the connection reconfiguration, it sends a RRC connection reconfiguration complete message to the MeNB.

Then in a step S10 the user equipment sends a random access preamble message to the SeNB.

In a step S11 the SeNB sends a random access response to the user equipment.

In a step S12 the user equipment sends an other message (C-RNTI (or Controlling-Radio Network Temporary Identifier)) to the SeNB, which completes the synchronization towards the (small) cell of the SeNB.

In a step S13 the SeNB sends an addition (or resource) complete message to the MeNB, to inform that the new configuration is being in use already.

Then in a step S14 the MeNB may send an E-RAB modification indication message to the associated MME (or Mobility Management Entity).

In a step S15 the MME and the associated S-GW (or Serving-GateWay) register the bearer (or E-RAB) modification resulting from the bearer(s) offload provided by the chosen SeNB to the concerned user equipment.

Finally in a step S16 the MME may send an E-RAB modification confirmation message to the MeNB, to inform that the update of the user plane path towards the EPC ("Evolved Packet Core") is performed.

In step S2 there may be several concurrent attempts for different user equipment's to offload bearers from the MeNB to the chosen SeNB, and/or there may be tentative from an other MeNB to offload bearers to the chosen SeNB, and/or the chosen SeNB may be a serving eNB for at least one user equipment which it serves directly. Therefore another user equipment characteristic parameter, such as the estimated velocity indirectly contained in the user equipment history information parameter, could help the SeNB to arbitrate and optimize the allocation of resources. It is recalled that the user equipment history information contains information about cells that the user equipment has previously been served by in active state (or may be in idle state) (last visited cell list and last visited cell information (Global Cell ID, Cell Type, time user equipment stayed in cell, time user equipment stayed in cell enhanced granularity, and HO cause value)).

So, the user equipment history information can be used in a SeNB to estimate the user equipment velocity (or speed) and/or state which is/are also useful to set the mobility related parameters.

But today the user equipment history information is only provided over the X2 point-to-point interface if a handover takes place from a MeNB to a SeNB, because the whole user equipment context has to be relocated. In that case the SeNB can use the user equipment history information for the CAC (or Call Admission Control) for all the bearers relocated with the user equipment context and for setting some radio parameters. In contrast, in the dual connectivity case, i.e.

when at least one bearer must be offloaded as part of the dual connectivity feature, the chosen SeNB currently does not receive the user equipment history information from the MeNB and has thus no means to estimate the velocity of the user equipment for the resource admission control and optimization and the setting of radio parameters for resource optimization.

SUMMARY

So an object of this invention is to improve the situation by providing the user equipment history information of a user equipment to a SeNB that has been chosen by the MeNB serving this user equipment directly.

In a first embodiment, a method is intended for establishing a dual connectivity between a user equipment and a master evolved Node B and a secondary evolved Node B, and comprises:
- a first step during which the master evolved Node B chooses at least one secondary evolved Node B because it wants to offload a data rate requested by the user equipment,
- a second step during which the master evolved Node B sends a resource request, comprising data defining at least complementary radio resources to be allocated, E-RAB parameters, TNL address information corresponding to a user plane option, capabilities of the user equipment, current radio resource configuration for the user equipment, and a history cell information of the user equipment, to this chosen secondary evolved Node B, and
- a third step during which the chosen secondary evolved Node B determines from the data contained into this received resource request and from its not yet allocated radio resources if it can allocate this requested complementary radio resources for the user equipment and how to set appropriately the corresponding radio parameters.

For instance, the history cell information may contain information about cells that the user equipment has been served by in active state or idle state prior to the sending of the resource request to the chosen secondary evolved Node B.

Also for instance, in the third step the chosen secondary evolved Node B may estimate a velocity of the user equipment from the received history cell information data.

In a second embodiment, a computer program product comprises a set of instructions arranged, when it is executed by processing means, for performing the method presented above to allow establishment of a dual connectivity between a user equipment and a master evolved Node B and a secondary evolved Node B.

In a third embodiment, a device is intended for equipping an evolved Node B and is arranged:
- for choosing at least one secondary evolved Node B when its evolved Node B is a master evolved Node B serving a user equipment and wanting to offload a data rate requested by the user equipment, and
- for triggering transmission to this chosen secondary evolved Node B, by its master evolved Node B, of a resource request, comprising data defining at least complementary radio resources to be allocated, E-RAB parameters, TNL address information corresponding to a user plane option, capabilities of the user equipment, current radio resource configuration for the user equipment, and a history cell information of the user equipment.

For instance, this device may estimate a velocity of the user equipment from the received history cell information data.

This device may be also arranged, when its evolved Node B is a chosen secondary evolved Node B having received a resource request, comprising data defining at least complementary radio resources to be allocated, E-RAB parameters, TNL address information corresponding to a user plane option, capabilities of a user equipment, current radio resource configuration for this user equipment, and a history cell information of this user equipment, from a master evolved Node B serving this user equipment directly, for determining if its secondary evolved Node B can allocate these requested complementary radio resources for the user equipment and how to set appropriately the corresponding radio parameters from the data contained into this received resource request and from radio resources not yet allocated by its secondary evolved Node B.

BRIEF DESCRIPTION OF THE FIGURES

Some embodiments of method and device in accordance with an embodiment of the present invention are now described, by way of example only, and with reference to the accompanying drawings, in which.

DESCRIPTION OF EMBODIMENTS

Hereafter is notably disclosed a method intended for allowing establishment of a dual connectivity between a user equipment (or user wireless communication equipment) 1 and a master evolved Node B (or MeNB) 2, serving this user equipment 1 directly, and a secondary evolved Node B (or SeNB) 3.

In the following description it will be considered that the wireless communication equipment 1 is a 4G smartphone. But this is not limited to this kind of wireless communication equipment (or user equipment). Indeed, it concerns any type of wireless communication equipment capable of establishing communications with other wireless communication equipments or network equipments via at least one wireless (or mobile) communication network comprising eNode Bs (or eNBs (evolved Node Bs)) and therefore belonging at least to the 3GPP fourth generation (or 4G). So, a wireless communication equipment 1 could be also a tablet or a laptop, for instance.

Moreover in the following description it will be considered that the wireless communication equipments 1 are capable of establishing connections with 4G networks, such as 3GPP LTE networks.

Figure 1:
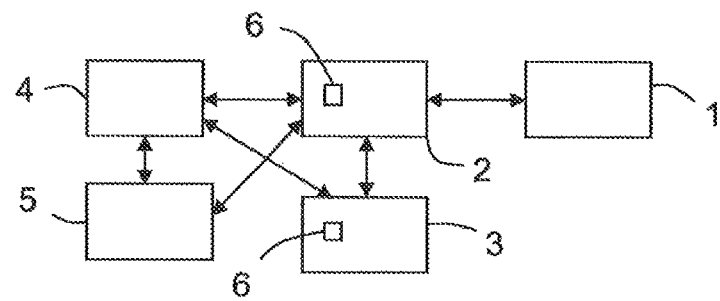
FIG. 1 schematically and functionally illustrates a part of a 4G mobile communication network to which a user equipment is connected, and FIG. 2 schematically illustrates a sequence diagram comprising arrows representing steps of an example of embodiment of a device according to the invention.

A very small part of a 4G mobile communication network is illustrated in FIG. 1. This network part comprises a master evolved Node B (or MeNB) 2, coupled to a Mobility Management Entity (or MME) 4 and to a Serving-GateWay (or S-GW) 5, and a secondary evolved Node B (or SeNB) 3 that may exchange data with the MeNB 2.

The functionalities of eNBs (i.e. MeNB and SeNB), MME and S-GW, and relations therebetween are well known by the man skilled in the art and defined by the 3GPP specifications, and notably in the part concerning the small cell enhancements. So, they will not be described in this document.

As mentioned before, the invention notably proposes a method intended for allowing establishment of a dual connectivity between a user equipment 1 and a MeNB 2, serving this user equipment 1 directly, and a SeNB 3. This method comprises at least three steps S1, S2 and S3.

A first step S1 of this method is initiated when the MeNB 2 wants to offload a data rate requested by a user equipment 1 it serves directly.

During this first step S1 the MeNB 2 chooses at least one SeNB 3 that is expected to be capable of allocating radio resources completing the radio resources it has allocated for the user equipment 1, to offer together the requested data rate.

This first step S1 may be implemented by a device 6 equipping each eNB 2 acting as a master. For instance, this device 6 may be the RRM (or Radio Resource Management) entity of the eNB 2 or a part of this RRM entity.

Such a device 6 is preferably made of software modules, at least partly. But it could be also made of a combination of hardware and software modules. In case where it is made of software modules it can be stored in a memory, possibly after having been downloaded, or in any computer software product.

In the second step S2 of the method the MeNB 2 sends a resource (or addition) request of a new type to the (each) chosen SeNB 3. This addition (or resource) request comprises data defining at least complementary radio resources to be allocated to the concerned user equipment 1, E-RAB parameters, TNL address information corresponding to a user plane option, capabilities of the concerned user equipment 1, current radio resource configuration for the concerned user equipment 1, and a history cell information of the concerned user equipment 1.

Preferably the history cell information of the concerned user equipment 1 contains information about cells that this user equipment 1 has been served by in active state or idle state prior to the sending of the resource request to the chosen secondary evolved Node B. It preferably comprises the last visited cell list and the last visited cell information (Global Cell ID, Cell Type, time the user equipment 1 stayed in cell, time the user equipment 1 stayed in cell enhanced granularity and HO cause value)).

This second step S2 may be also implemented by the device 6 that equips the concerned MeNB 2. The device 6 triggers transmission to each chosen SeNB 3, by its MeNB 2, of the resource request.

In the third step S3 of the method the (each) chosen SeNB 3 determines from the data contained into the received resource request and from its not yet allocated radio resources if it can allocate the requested complementary radio resources for the user equipment 1 and how to set the appropriate corresponding parameters.

For instance, the chosen SeNB 3 uses the history cell information data contained into the received resource request to estimate the user equipment velocity (or speed) and/or state. It can further use them for call admission control, resource optimization, and setting of radio parameters.

This third step S3 may be also implemented by the device 6 that equips the concerned eNB 3 that acts as a chosen SeNB. The device 6 determines if its SeNB 3 can allocate the requested complementary radio resources defined in the resource request received by this SeNB 3 and how to set the appropriate corresponding parameters.

In the case where the SeNB 3 can allocate the requested complementary radio resources for the user equipment 1 through a second bearer, it takes a RRM decision, then allocates complementary radio resources (L1 and L2) and may provide a dedicated RACH (or Radio Access CHannel) preamble for the user equipment 1 for synchronization.

Figure 2:
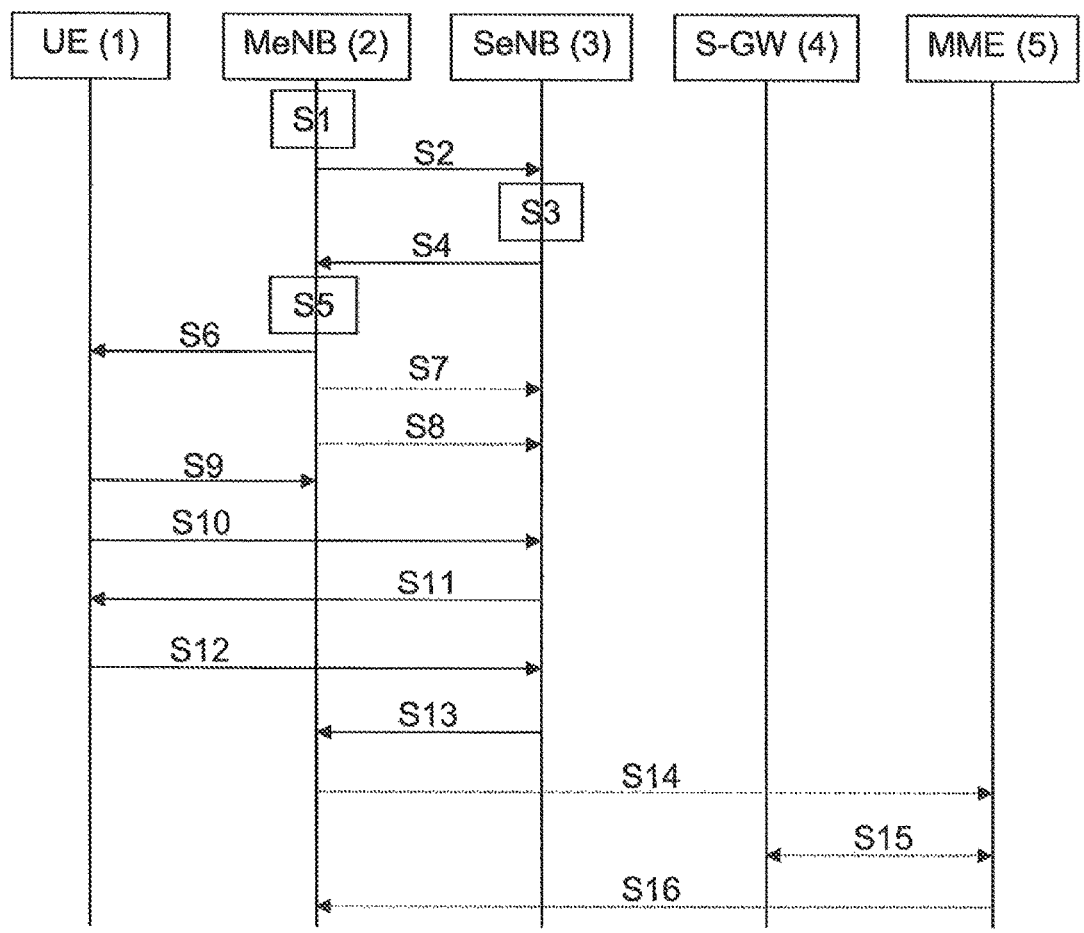

As illustrated in the non-limiting example of FIG. 2, the method according to the invention may further comprise a step S4 during which the SeNB 3 sends an addition (or resource) response to the MeNB 2 in response to the addition (or resource) request transmitted during the second step S2.

It may further comprise a step S5 during which the MeNB 2 determines if it can endorse the proposed radio configuration. So, it takes another RRM decision.

If the MeNB 2 endorses the proposed radio configuration, the method may further comprise a step S6 during which this MeNB 2 sends a RRC (or Radio Resource Control) connection reconfiguration message, comprising information defining this proposed radio configuration, to the concerned user equipment 1.

It may further comprise a step S7 during which the MeNB 2 sends a SN (or Sequence Number) status transfer message, comprising PDCP sequence numbers, to the chosen SeNB 3 that has accepted to allocate the requested complementary radio resources.

It may further comprise a step S8 during which the MeNB 2 triggers data forwarding towards the chosen SeNB 3 that has accepted to allocate the requested complementary radio resources.

If the concerned user equipment 1 has proceeded to the connection reconfiguration, the method may further comprise a step S9 during which the concerned user equipment 1 sends a RRC connection reconfiguration complete message to its MeNB 2, in response to the received RRC connection reconfiguration message.

It may further comprise a step S10 during which the concerned user equipment 1 sends a random access preamble message to the chosen SeNB 3 that has accepted to allocate the requested complementary radio resources.

It may further comprise a step S11 during which the chosen SeNB 3 sends a random access response to the user equipment, in response to the received random access preamble message.

It may further comprise a step S12 during which the concerned user equipment 1 sends an other message (C-RNTI (or Controlling-Radio Network Temporary Identifier)) to the chosen SeNB 3 that has accepted to allocate the requested complementary radio resources, which completes the synchronization towards the (small) cell of the chosen SeNB 3.

It may further comprise a step S13 during which the chosen SeNB 3 sends an addition (or resource) complete message to the MeNB 2, to inform that the new radio configuration is being in use already.

It may further comprise a step S14 during which the MeNB 2 sends an E-RAB modification indication message to the associated MME 4.

It may further comprise a step S15 during which the MME 4 and the associated S-GW 5 register the bearer (or E-RAB) modification resulting from the bearer(s) offload provided by the chosen SeNB 3 to the concerned user equipment 1.

Finally it may further comprise a step S16 during which the MME 4 sends an E-RAB modification confirmation message to the MeNB, to inform that the update of the user plane towards the EPC (Evolved Packet Core) is performed.

By enabling a transfer of the user equipment history information during the offload of at least one bearer from a MeNB to a SeNB in a dual connectivity feature, the invention allows this SeNB to estimate the user equipment velocity (or speed) and then optimize resource allocation and setting of radio parameters.

The functions of the various elements shown in the figures may be provided through the use of dedicated hardware as well as hardware capable of executing software in association with appropriate software.

It should be appreciated by those skilled in the art that any block diagrams herein represent conceptual views of illustrative circuitry embodying the principles of the invention.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. Method for establishing a dual connectivity between a user equipment and a master evolved Node B and a secondary evolved Node B, said method comprising i) a first step during which said master evolved Node B chooses at least one secondary evolved Node B because it wants to offload a data rate requested by said user equipment, ii) a second step during which said master evolved Node B sends a resource request, comprising data defining complementary radio resources to be allocated, E-UTRAN radio access bearer (E-RAB) parameters, transport network layer (TNL) address information corresponding to a user plane option, capabilities of said user equipment, current radio resource configuration for said user equipment, and a history cell information of said user equipment, to said chosen secondary evolved Node B, and iii) a third step during which said chosen secondary evolved Node B determines, based on said data contained in said received resource request, if it can allocate said requested complementary radio resources to said user equipment and how to set corresponding radio parameters wherein in the third step said chosen secondary evolved Node B estimates a velocity of said user equipment from said received history cell information data.

2. Method according to claim 1, wherein said history cell information contains information about cells that said user equipment has been served by in active or idle state prior to the sending of said resource request to said chosen secondary evolved Node B.

3. A non-transitory computer-readable recording medium having a program with instructions for causing a processing entity to perform the method of claim 1 to allow establishment of a dual connectivity between the user equipment and the master evolved Node B and the secondary evolved Node B.

4. Device for an evolved Node B, said device being arranged i) for choosing at least one secondary evolved Node B when said evolved Node B is a master evolved Node B serving a user equipment and wanting to offload a data rate requested by said user equipment, and ii) for triggering transmission to said chosen secondary evolved Node B, by said master evolved Node B, of a resource request, comprising data defining at least complementary radio resources to be allocated, E-UTRAN radio access bearer (E-RAB) parameters, transport network layer (TNL) address information corresponding to a user plane option, capabilities of said user equipment, current radio resource configuration for said user equipment, and a history cell information of said user equipment, wherein it is arranged for estimating a velocity of said user equipment from said received history cell information data.

5. Device according to claim 4, wherein it is arranged, when its evolved Node B is a chosen secondary evolved Node B having received a resource request, comprising data defining at least complementary radio resources to be allocated, E-RAB parameters, TNL address information corresponding to a user plane option, capabilities of a user equipment, current radio resource configuration for said user equipment, and a history cell information of said user equipment, from a master evolved Node B serving said user equipment directly, for determining if its secondary evolved Node B can allocate said requested complementary radio resources to said user equipment and how to set corresponding radio parameters from said data contained into said received resource request and from radio resources not yet allocated by said secondary evolved Node B.

* * * * *